United States Patent [19]

Kupcikevicius et al.

[11] 3,975,795
[45] Aug. 24, 1976

[54] PRODUCT STUFFING APPARATUS AND METHOD

[75] Inventors: Vytautas Kupcikevicius; Joseph A. Nausedas; Vytas A. Raudys, all of Chicago, Ill.

[73] Assignee: Union Carbide Corporation, New York, N.Y.

[22] Filed: Jan. 20, 1975

[21] Appl. No.: 542,601

[52] U.S. Cl. .................................. 17/41; 17/49
[51] Int. Cl.² ........................................ A22C 11/02
[58] Field of Search ............... 17/41, 33, 35, 49, 42

[56] References Cited
UNITED STATES PATENTS

| | | | |
|---|---|---|---|
| 2,754,538 | 7/1956 | Maier | 17/41 |
| 2,863,167 | 12/1958 | Nordin | 17/41 |
| 3,621,513 | 11/1971 | Kupcikevicius | 17/41 |
| 3,860,996 | 1/1973 | Kupcikevicius et al. | 17/49 |
| 3,890,675 | 8/1973 | Nausedas | 17/41 |

FOREIGN PATENTS OR APPLICATIONS

| | | | |
|---|---|---|---|
| 812,307 | 4/1959 | United Kingdom | 17/33 |

*Primary Examiner*—Louis G. Mancene
*Assistant Examiner*—James D. Hamilton
*Attorney, Agent, or Firm*—Cornelius F. O'Brien

[57] ABSTRACT

Apparatus and method for stuffing cold, viscous product into normally flexible film tubing such as shirred tubular plastic film, comprising a stuffing horn having secured to its discharge end a pleat dispersing collar, and inboard thereof a loosely fitted deshirring ring, which coact during stuffing of the tubing to uniformly unfold the pleated film and thereby provide a smoothly stuffed tubular article.

11 Claims, 4 Drawing Figures

PRODUCT STUFFING APPARATUS AND METHOD

FIELD OF THE INVENTION

The present invention relates to an apparatus and method for stuffing a flowable mass of materials, such as food emulsions, into flexible tubing, such as flexible plastic film casings. More particularly, the invention relates to an apparatus and method ideally suited for use in refrigerated room packaging operations with cold, stiff viscous meat emulsions which are stuffed into shirred lengths of normally flexible plastic film tubing whereby the folds and pleats in said shirred tubing are effectively and substantially straightened and removed as the tubing is being stuffed.

BACKGROUND OF THE INVENTION

In the meat packing industry, techniques are known for the automatic and semiautomatic filling of various types of casings which comprise the deshirring and stuffing of a shirred continuous film casing length which has been placed over a stuffing horn, with viscous meat emulsion fed under pressure through the stuffing horn and into the casing interior. In this discussion, the term "casing length" is intended to mean continuous tubular casing lengths. Tubular casings are also known to persons familiar with the art as "sticks", such "sticks" being long lengths of casing having a substantially large bore, which has been shirred and compressed into short compact self-sustaining lengths, or which may be a shirred and compressed casing sheathed inside a retaining sleeve, or mounted on a semi-rigid retaining tube. Using suitable food stuffing machinery, casing lengths can be stuffed and formed into unit size packages of particulate viscous materials, such as ground fresh meats, or the like. It is to be understood that the invention is not limited to such stuffed products, but is equally advantageous for the encasing of stuffed products of viscous material, such as fats, cheese, ice cream, scrapple, meat products, as well as lard, oleomargarine, grease and other products normally stuffed into casings.

The materials from which the casing lengths discussed herein are manufactured, are typically thin-walled, flexible thermoplastic films prepared from polyethylene and other polyolefins, polyvinylidene chloride, polyvinylchloride, polyesters and the like, or they may be prepared from unsupported or fibrous reinforced cellulose, or any other suitable material. Apparatus and processes are well known in the food casing art for shirring tubular cellulosic food casing such as, for example, disclosed in U.S. Pat. Nos. 2,983,949 and 2,984,574 to Matecki. These apparatus may be employed in the preparation of pleated and compressed tubular casings wherein the compression ratios (unshirred to shirred stick length) are in the order of at least about 40:1 and up to about 100:1 or even greater.

In the art of producing sausages and similar food products, finely divided meat compositions commonly referred to as emulsions are conventionally stuffed into tubular material of long length which, as stated above, may be of natural or manufactured materials. The stuffed tubing is then tied, twisted or clipped into predetermined unit length packages. For many years, the apparatus and methods employed to prepare the encased food products and particularly food products encased in large diameter casings have relied upon manual manipulation in controlling the stuffing of food emulsion into predetermined length sausage links or packages. Recently, advances in the art have resulted in the introduction of apparatus for machine control of the stuffing operation which have provided means for preparing uniformly sized encased food products as, for example, disclosed in U.S. Pat. Nos. 2,871,508, 2,999,270, 3,264,679, 3,317,950, 3,454,980, 3,457,588, 3,553,769, 3,621,513, 3,659,317 and 3,751,764.

Of the most recent advances in the art, several satisfactory methods and apparatus are available for sausage production in the smaller diameter and length sizes, frankfurters particularly, and also for large casing stuffing to produce larger diameter and length bologna, salami, liverwurst and the like products.

Generally these processed meat products wherein the meat emulsions are formulated with spices, salt and other preservatives, are stuffed and then cooked and smoked. These emulsions are generally worked in sausage kitchens maintained at about 55°F. Coarse ground fresh meat has no preservatives added before packaging and in order to insure its freshness must be handled and kept at colder temperatures such as about 32°F to 45°F. Consequently casing materials for packaging cold viscous product in cold rooms tend to be more difficult to handle.

In attempting to adapt presently available viscous food stuffing technology to cold room operations for the continual semiautomatic packaging of ground fresh meats, problems have been encountered. Methods and apparatus which work satisfactorily at or near sausage kitchen temperatures are found to produce less than satisfactory results in fresh meat packaging cold rooms. The U.S. Pat. No. 3,553,769 to Myles et al and U.S. Pat. Nos. 3,621,513 and 3,659,317 to Kupcikevicius, assigned to the same assignee as this patent, illustrate the stuffing technology under discussion. The major problems encountered are in large part attributable to the effect of the lower temperatures of the cold room and cold equipment on the packaging films used. Cellulosic film casings are either preconditioned by controlled humidification or are soaked in water immediately prior to stuffing in order to soften them, and thereby permit deshirring or unfolding them into a tightly stuffed casing that is clip closed into a tight package without wrinkles or loose folds. Plastic film casings which are normally pliable at temperatures of about 70° are not softened by water and become relatively stiff and brittle in cold rooms below about 55°F, thereby tending to retain folds and pleats when stuffed and even to crack and tear during the operation of closing the package by constricting the ends of the tubing preparatory to applying end closure clips thereat.

Although cold room stuffing of fresh ground meat also involves a product which is significantly more viscous and rather particulate in form and thus quite a bit different in character from the smooth easy flowing emulsions normally encountered in conventional sausage stuffing practice, it has recently been found that using techniques as disclosed in U.S. Pat. Nos. 3,553,767 and 3,621,513 and as disclosed in U.S. application Ser. No. 325,211 (now U.S. Pat. No. 3,860,996) good clean product-free closure zones have been obtained with cellulosic casings so that sealing clips can be satisfactorily applied adjacent the open ends of just filled casings.

With this being the state of the art, it is an object of this invention to provide a method and apparatus admirably suited for cold room stuffing of extremely viscous product into shirred casings of film materials which become less flexible, non-pliant or stiff at cold temperatures.

Another object of this invention is to provide an apparatus particularly suitable for cold room stuffing of normally flexible plastic film casings with ground fresh meat.

Another object of the present invention is to provide means for efficiently and continuously deshirring flexible plastic film casings so as to effectively eliminate folds and pleats in such casings when they are stuffed with food product.

Another object is to provide an apparatus and method wherein primary means are used to initiate the opening of the folds and pleats in a casing followed by secondary means for depleating and smoothing of the film wall of the casing prior to such casing being stuffed with food product.

These and other advantages and features of the present invention will become apparent from the ensuing description and from the accompanying drawings.

SUMMARY OF THE INVENTION

The invention broadly relates to an apparatus for stuffing flowable product into shirred tubing which comprises:
a. a stuffing horn having an inlet end for receiving flowable product from a pressurized supply and a discharge end for discharging the product;
b. a collar concentrically centrally detachably secured on said horn having a tapered surface portion proximal said horn discharge end;
c. a rim portion positioned at the aft end of said collar concentrically disposed around said horn;
d. a first annulus having an internal diameter larger than the outer diameter of said stuffing horn and smaller than the outer diameter of the rim, said annulus being loosely centrally disposed on said horn intermediate said rim and said horn inlet end to define a passage through which tubing being stuffed can be constricted to effectively provide primary depleating of the tubing whereupon the tubing can then be advanced toward and over said rim to effectively provide secondary depleating and unfolding of the tubing;
e. a second annulus removably centrally aligned with said stuffing horn having a tapered inner surface adapted to mate with said tapered surface portion of said collar disposed on said horn to define a passage of predetermined spacing proximal said horn discharge end through which the tubing being stuffed can be constrained in slipping movement as it is being stuffed with a pressurized flowable product;
f. means to intermittently advance and retract said second annulus to and from the mating arrangement with said collar;
g. product stoppering means adapted to be indexed to a first position so as to allow the passage of pressurized product out through the discharge end of the stuffing horn and then to be indexed to a second position so as to prevent the flow of pressurized product out through said discharge end of the stuffing horn; and h. means to index said stoppering means selectably at said first and second positions.

The apparatus of this invention can be also equipped with carriage means for mounting the second annulus (also referred to as the casing restraining means), a support trough for the casing being stuffed, and means for reciprocating and indexing the carriage from a casing loading station to a clip closing station, and then to a product loading station as will be described below. The carriage can be also equipped with means for mounting a third annulus or product flowback control means adapted to be removably centrally aligned with said stuffing horn and having an inner diameter larger than said horn discharge end so as to define a circumferential passage of predetermined spacing through which the tubing being stuffed can be passed to effectively prevent flowback of the pressurized flowable product exiting from the horn discharge end. Also mounted on the carriage can be means for independently reciprocating the third annulus from the product stuffing station to the clip closing station.

As stated above, the apparatus can have motive means operably connected to index the carriage means from a first site or casing loading station at which a shirred tubing can be sheathed onto the stuffing horn with the outboard end of the tubing manually fed through the passages described above to a second site at which the unfilled casing can be closed with a first or fore end closure and then indexed to a stuffing station where the casing can be stuffed with a pressurized product. In addition, and as stated above, the apparatus can have motive means to independently index the product flowback control means from a first site (stuffing station) at which the unfilled fore end clip closed casing is stuffed, to a second site at which means are provided for closing the filled casing with an aft end closure. Additional means could be provided for severing the casing intermediate the aft and fore end closures. If desired, the aft and fore end closures could be provided simultaneously at the same site with the severing of the casing occurring immediately thereafter.

Some of the above features of the apparatus are similar to the features of the stuffing apparatus disclosed in U.S. Pat. No. 3,621,513 to Vytautus Kupcikevicius and U.S. application Ser. No. 325,211 to Vytautus Kupcikevicius et al.

The product stoppering means can be used as disclosed in U.S. application Ser. No. 385,306 to Joseph Nausedas (now U.S. Pat. No. 3,890,675) or Ser. No. 325,211 to Vytautus Kupcikevicius et al, (now U.S. Pat. No. 3,860,996) both of which are assigned to the same assignee as the subject invention. The product stoppering means so disclosed is disposed longitudinally concentrically interiorly of a stuffing horn and adapted so as to be reciprocally movable inboard of the discharge end of said horn, via suitable means, between a first position in which the product stuffing flow proceeds through the stuffing horn and around the stoppering means into a casing and a second positon in which product stuffing flow is stopped by plugging the discharge end of the stuffing horn.

The invention also relates to a method for sheathing a long length shirred tubing on a stuffing horn preparatory to stuffing the fore end wall of the tubing with pressurized product and forming it into unit size packages which comprises:
a. sheathing a shirred tubing onto a stuffing horn having an inlet end and a discharge end;

b. deshirring and advancing the fore end of the tubing through the inner diameter of a first annulus loosely disposed on said horn toward the discharge end of said horn;

c. further advancing said tubing force end about a rim disposed at the aft end of a collar secured proximal the discharge end of said horn; and d. closing the fore end of the tubing wall with a fluid-tight closure at the fore end of the collar.

The invention also relates to a method of stuffing flowable product into shirred tubing which comprises:

a. disposing a shirred tubing on a stuffing horn having an inlet end and a discharge end according to the method preparatory for stuffing the tubing as set out above, wherein the fore end of the tubing is threaded through a first annulus thereby providing primary depleating of the tubing, thence about a rim disposed at the aft end of a tapered collar secured proximal the discharge end of the horn so as to provide secondary depleating and unfolding of the tubing, then closing the tubing wall at the fore end of the tapered collar with a fluid-tight first closure and then retracting said closed tubing to abut the discharge end of said stuffing horn;

b. releasing a pressurized flowable material from the discharge end of said stuffing horn to advance the shirred tubing through primary depleating means and secondary depleating and unfolding means, to progressively stuff the tubing;

c. stopping the flow of pressurized material after a predetermined length of tubing has been stuffed;

d. advancing the stuffed tubing from the discharge end of said stuffing horn to a closure station;

e. applying an aft end closure for said stuffed tubing at the closure station;

f. further advancing said stuffed tubing to position the trailing unfilled tubing at said closure station;

g. applying a fore end closure for said succeeding trailing unfilled tubing;

h. severing said stuffed closed end tubing intermediate said aft end closure and said fore end closure; and i. removing said stuffed closed end tubing.

The apparatus and method of the present invention will become apparent from the following description thereof when reconsidered together with the accompanying drawing which is set forth as being exemplary of an embodiment of the present invention and is not intended, in any way, to be limitative thereof and wherein:

DETAILED DESCRIPTION

With reference to the drawing, a stuffing apparatus according to the present invention is illustrated showing a flexible plastic tubular film packaging tubing or casing 4 disposed in a shirred or pleated condition on a stuffing horn 6, the latter of which is coupled to a food product dispenser not shown. Stuffing horn 6 is formed with a discharge outlet 2 which has an outer peripheral dimension less than the peripheral inner dimension or bore of the shirred tubing or casing 4 as shown in each of the Figures of the drawings. The fore end of casing 4 has been deshirred and interiorly threaded through pleat deshirring ring or annulus 10, with the shirred length of casing sheathed onto stuffing horn 6 followed by a truncated conical pleat dispersing collar 8, the latter of which is removably secured to stuffing horn 6 in a bayonet type fastening by projecting pins 12. The larger diameter of the conical portion 15 of collar 8 terminates with a rim portion 14 which has an outer diameter smaller than the inner diameter of inflated casing 80 so as to expand casing 4 to eliminate folds and pleats therein when casing 4 is advanced from ring 10 toward discharge outlet 2.

Within the bore 16 of stuffing horn 6 is mounted a product stoppering device 18 comprising a centrally positioned connecting rod 20 and plunger 19, said rod 20 being longitudinally movable within the bore 16 by conventional pneumatic cylinder means or the like (not shown). At the fore portion of the plunger 19 a shoulder 22 is provided which is adapted to mate with and seat within the internal tapered portion 24 of the discharge or outlet end 2 of stuffing horn 6 so that in the completely advanced position shown in FIG. 1, the plunger 19 prevents flow of product through stuffing horn 6. In the retracted position, as shown in FIG. 2, the outlet 2 is opened and product can be dispensed therefrom. The aft portion 26 of plunger 19 is of streamlined or conical configuration to permit ready flow of the product thereabout.

An annular ring element 28 having a truncated conical shaped interior bore surface 27 to mate with the truncated conical shaped exterior surface 15 of pleat dispersing collar 8 is adapted to be disposed concentrically on stuffing horn 6 in mating relationship with collar 8 so as to define a truncated conical passage 30 (FIG. 2) through which casing 4 advances in a controlled friction slipping movement as it is being stuffed. Annular ring 28 is secured to carriage assembly 32 which is arranged and disposed to move reciprocally longitudinally parallel to the axis of stuffing horn 6. Carriage assembly 32 comprises a carriage frame 34 rotatably mounting a roller 36 riding on a track 37 in turn secured to apparatus frame 72, a package article trough 38, an upright rear bracket 40 and upright fore bracket 42. Bracket 42, in addition to supporting trough 38, supports a horizontally disposed product indexing cylinder 44. Piston rod 45 of cylinder 44 is secured to mounting plate 90 which in turn mounts vertically disposed package shaping annulus 46 and emulsion flowback seal annulus 48. Flowback seal annulus 48 is adapted so that during the stuffing operation, it is disposed adjacent and concentrically over discharge end outlet 2 of horn 6 and loosely urges the casing being stuffed against the outer surface of the stuffing horn outlet 2 snugly enough to prevent product backflow along the outer surface of the stuffing horn 6.

The upright bracket 40 is fixedly attached at the rear of carriage frame 34 and constitutes the main strucutral support for annular ring element 28 and bag severing means 50. Bag severing means 50 is fixedly attached to bracket 40 by four spacing pins 52 which are secured to plate 62. Plate 62 in turn mounts lower bracket 64 to which is secured pneumatic cylinder 56 operatively connected to film gathering shoe 54. Upper bracket 66 is mounted to plate 62 to which is secured pneumatic cylinder 60 operatively connected to knife 58.

A bag neck closure apparatus 68 such as a commercial metal clip closure device is disposed substantially concentrically of and between annular ring element 28 and bag severing means 50.

Motive means for reciprocating the carriage assembly 32 is provided by a three position pneumatic cylinder assembly 69 comprising a carriage cylinder 70 having piston rod 76 fastened to carriage frame 34, the head end of cylinder 70 being secured coterminous to frame cylinder 71. Cylinder 71 has piston rod 77 fastened to bracket 74 in turn secured to frame 72.

The upper portion of bracket 74 is adapted to threadably mount an adjustable stop member 92 the fore end 94 of which abuts stop pad 41 on rear bracket 40 to limit movement of carriage 34 indexed to its retracted or stuffing position, the stop member thereby indexing ring element 28 with surface 15 of collar 8 to provide a predetermined spacing for passage 30.

The operation of the illustrated apparatus according to the invention is shown sequentially in the drawing, FIGS. 1, 2, 3, and 4.

Figure 1:
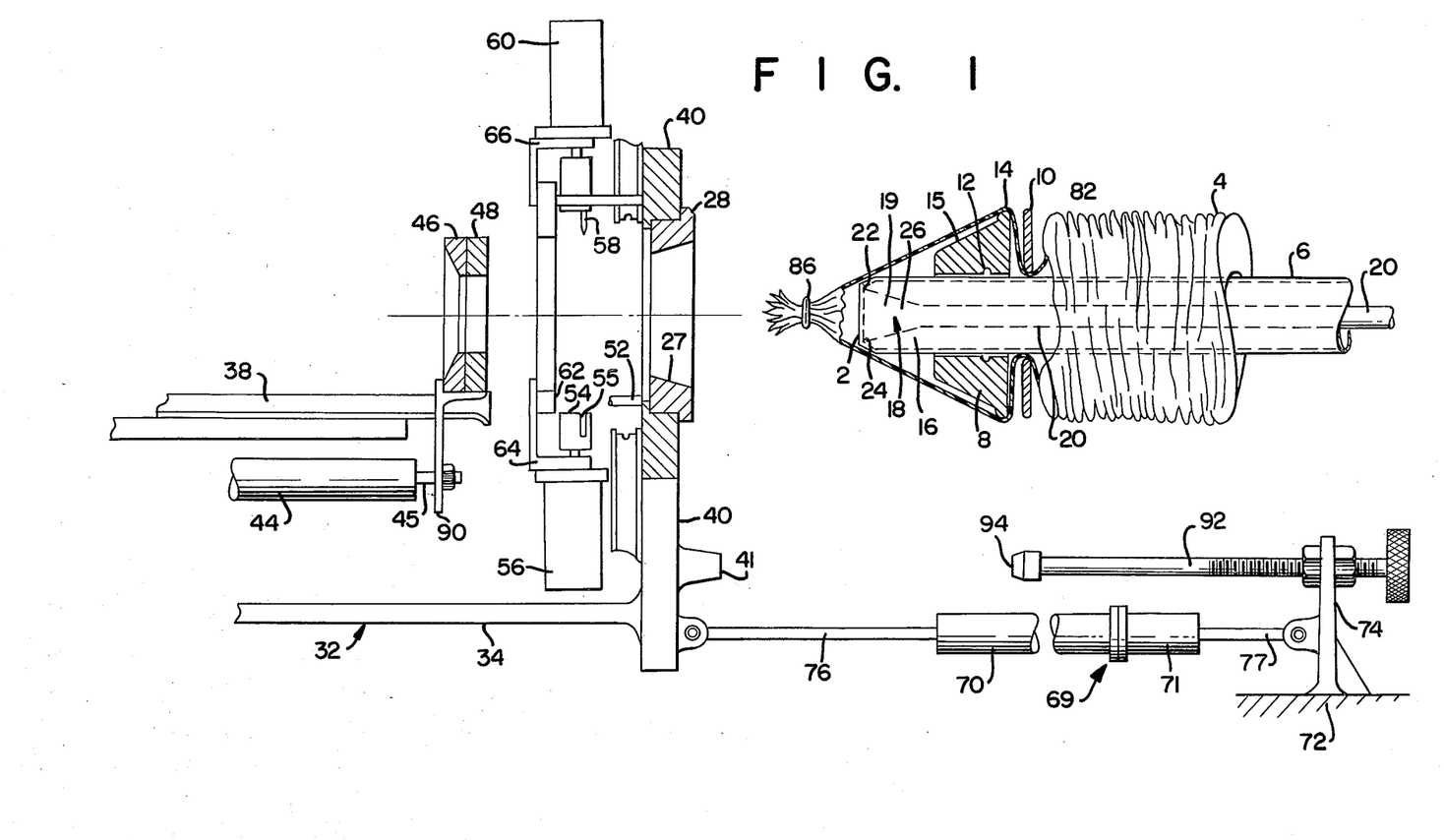
FIG. 1 is a vertical sectional view through an apparatus according to the invention showing a casing on a stuffing machine just prior to its movement into position for receiving a stuffing product.
Figure 2:
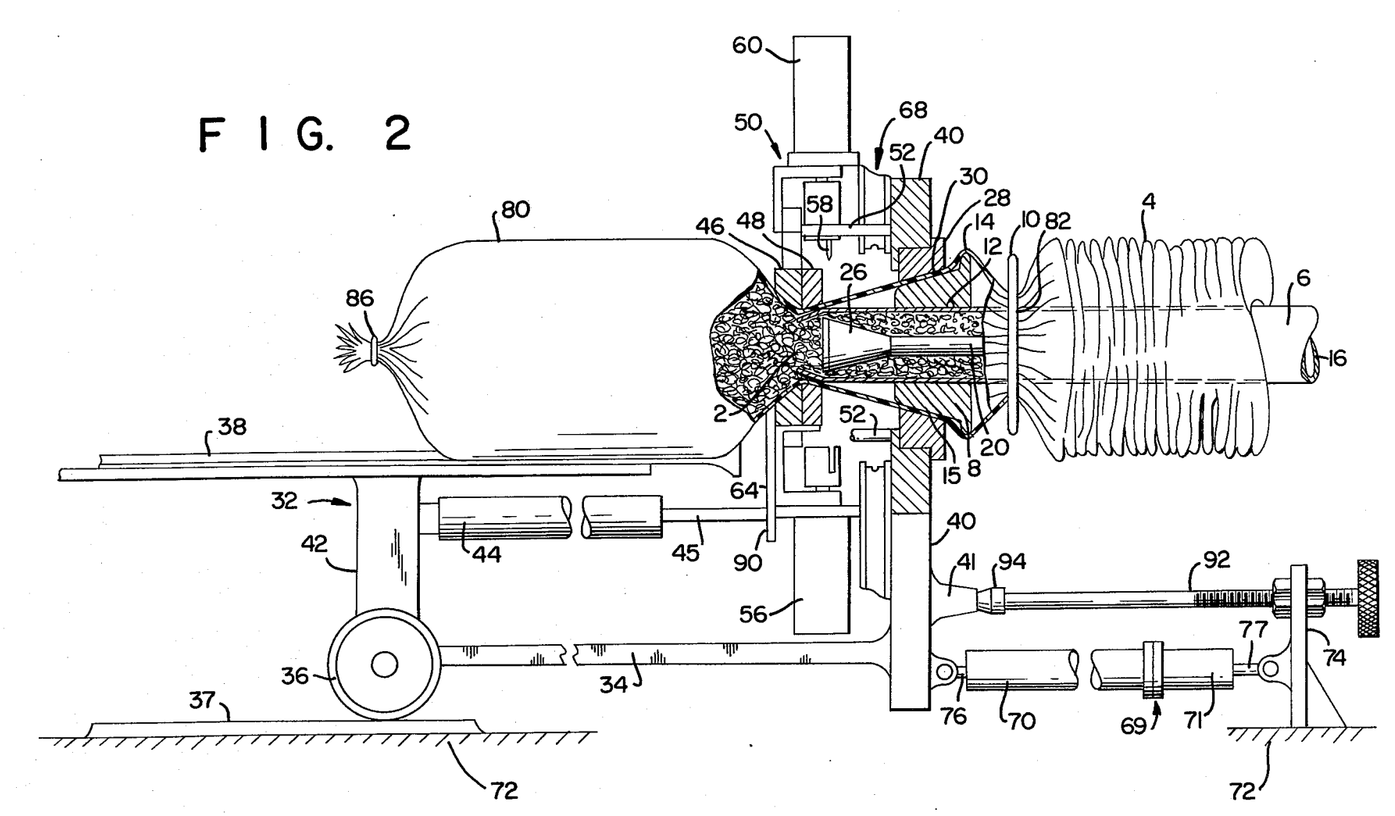
FIG. 2 shows the apparatus of FIG. 1 with the filling step substantially complete.
Figure 3:
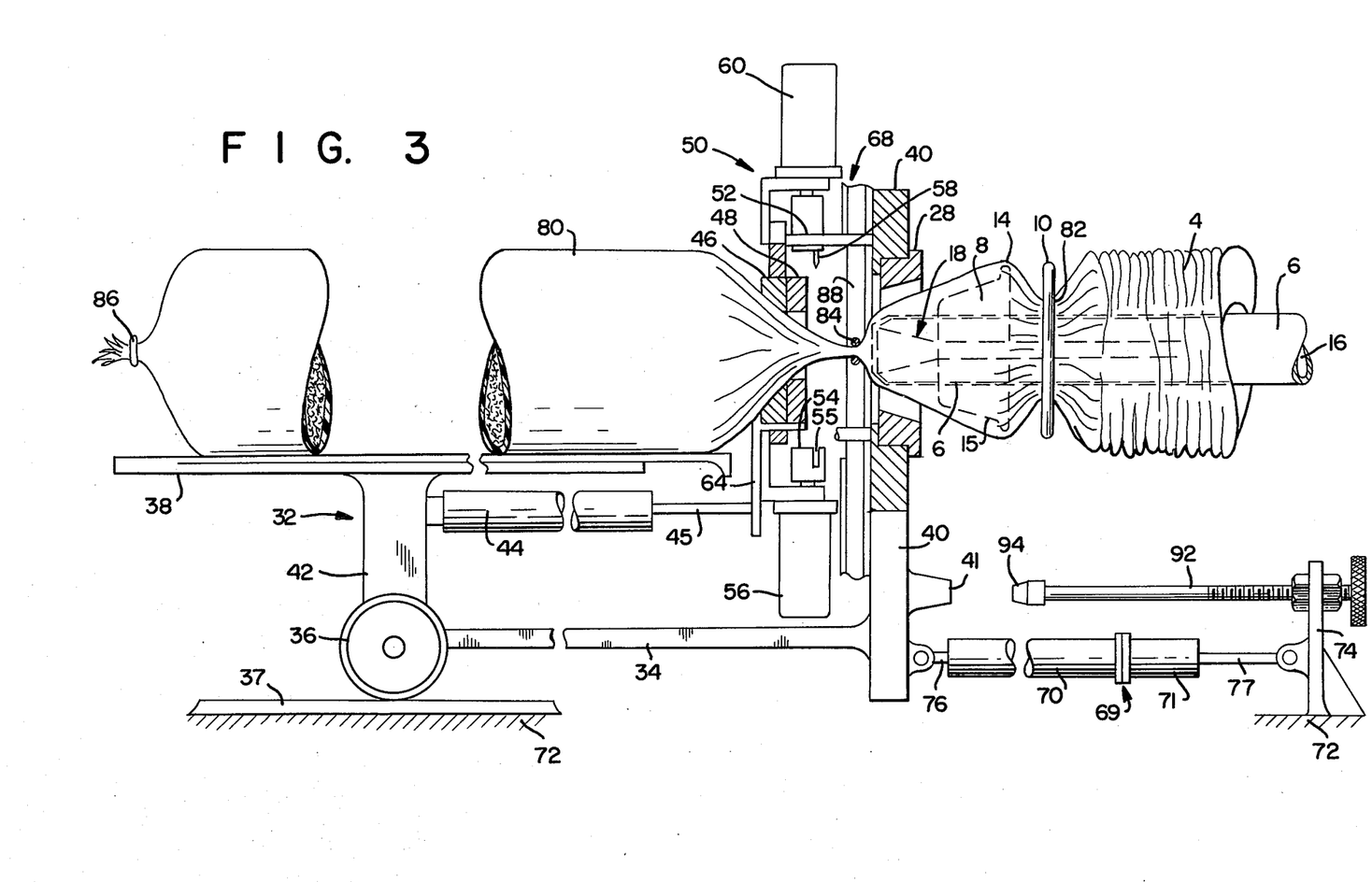
FIG. 3 shows the apparatus of FIG. 1 with the just filled casing advanced forward of the stuffing horn and closure means effecting a closure of the just filled casing.
Figure 4:
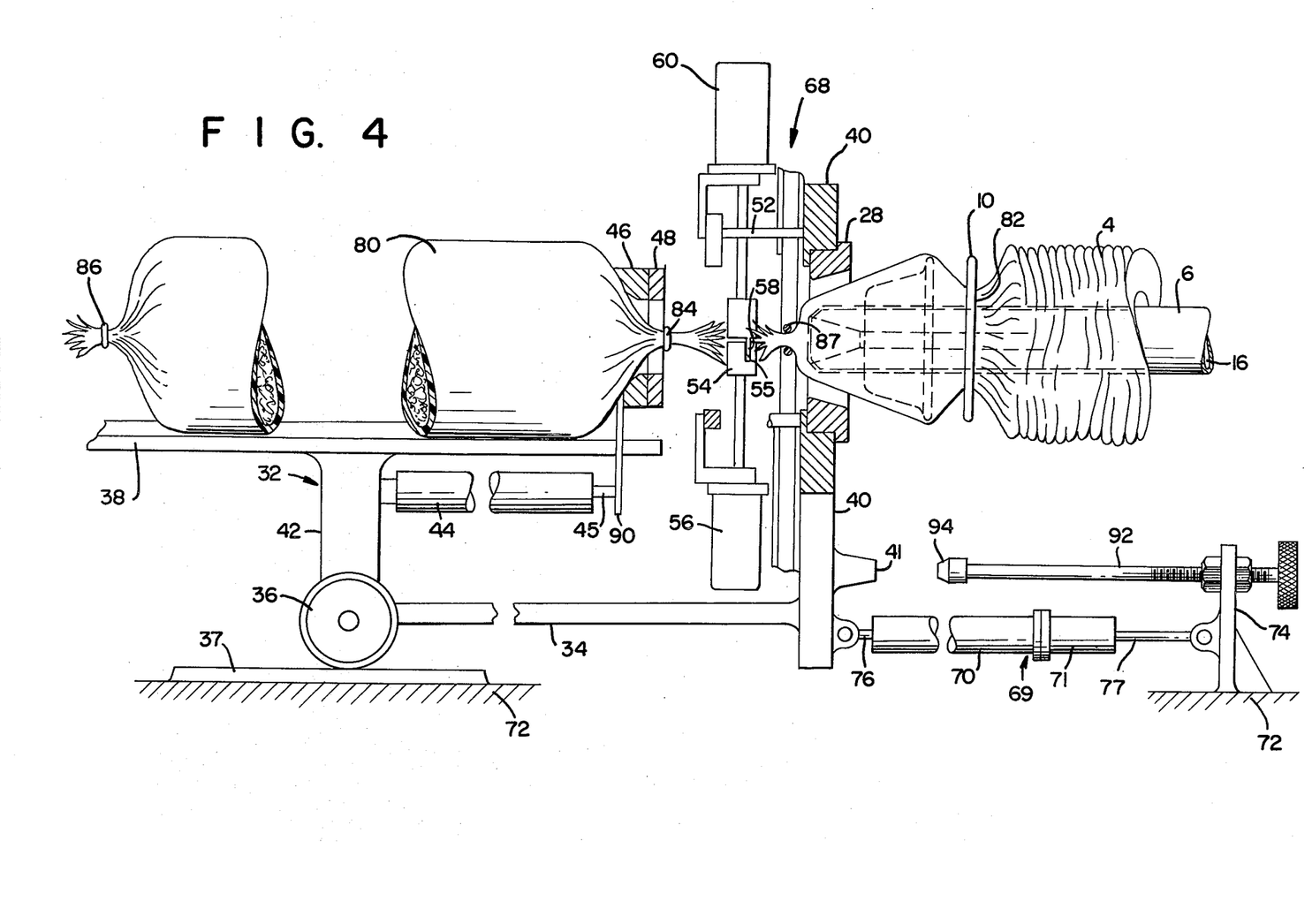
FIG. 4 shows the apparatus of FIG. 1 with the closed casing advanced forward of the stuffing horn and severing means effecting a cutting of the casing behind the closed end of said casing to provide a stuffed casing package of predetermined length.

In FIG. 1, a stuffing operation is shown in the initial stage wherein a casing 4 is disposed on stuffing horn 6 with its fore end segment deshirred and threaded through ring 10, slipped over tapered pleat dispersing collar 8 and closed by sealing clip 86. In this stage of the operation, product stoppering device 18 is fully advanced to the discharge end 2 of stuffing horn 6 thereby blocking the outlet opening 24 in said stuffing horn 6. Both carriage cylinder 70 and frame cylinder 71 of cylinder assembly 69 are actuated to fully retract carriage assembly 32 and abut stop pad 41 with the fore end 94 of stop member 92, thereby positioning ring 28 in mating spaced relationship with pleat dispersing collar 8 to define truncated passage 30 as shown in FIG. 2. Next, the product stoppering device 18 is retracted so as to allow the pressurized product to flow into casing 4. As casing 4 is being filled, it is supported on trough 38 and as the stuffed casing advances under the product stuffing flow pressure, the supply of shirred casing 4 is necked down around the inside diameter of pleat deshirring ring 10 through primary annular passage 82 defined by ring 10 and stuffing horn 6, followed by its expansion about rim 14 of tapered annular collar 8. Thereafter, the deshirred casing is advanced through conical passage 30, over the outer peripheral surface of stuffing horn discharge end 2 and out through the product flowback restraining annulus 48 into its fully expanded filled condition 80 as shown at the left of FIGS. 3 and 4. As the casing is advanced under the product stuffing flow pressure, flowback restraining element 48 prevents the product from backing up on the outside of the stuffing horn 6. Of particular interest at this stage of the stuffing operation is the operation and function of deshirring ring 10 and pleat dispersing collar 8. As stated above, the inside diameter of deshirring ring 10 is larger than that of stuffing horn 6 so as to allow the shirred casing 4 to slide therebetween in passage 82 while the circumference of rim 14 of collar 8 is smaller than the opened, unshirred diameter of the casing 4 so as to permit the deshirred casing 4 to slide freely over it. Thus, as the stuffed product 80 moves forward, it pulls the pleated, folded casing from its shirred condition through passage 82 thereby providing a primary opening of the folds and pleats in said casing 4. As the stuffed casing 80 is further advanced, the unfilled casing is expanded over and about rim 14 of pleat dispersing collar 8 thereby providing a secondary depleating and unfolding of the casing whereupon it is then advanced through passage 30 and over the discharge end 2 of stuffing horn 6 to product flowback restraining annulus 48 where the casing is fully stuffed out. It is the cooperative arrangement of ring 10 and the rim 14 of collar 8, that enables the folds and pleats in the casing to be effectively eliminated. It is believed that the relatively small passage 82 restricts the flow of the casing by necking the shirred tubing to a smaller diameter, thereby creating a primary slight tension force to effectively and efficiently open the folds and pleats in the shirred casing as it slides under ring 10 and over rim 14.

Also, the primary slight tension in the casing provided by passage 82 as noted above, is desirably maintained in the unfilled casing at the termination of the stuffing, clipping and severing of the just-filled casing package to maintain the center of the fore end closure of the unfilled casing substantially on the center line of the stuffing discharge end 2. If the fore end of the unfilled casing is not centered on the discharge end 2 at start of the stuffing operation, the casing can be adversely folded and pinched between the retraction of annulus 48 and the stuffing horn 6 thereby causing breakage of the casing.

Without the arrangement of ring 10 and rim 14, the folds and pleats in the shirred casing do not dispense or unfold uniformly before entering passage 30 and thereby cause localized excessive non-uniform and uncontrollable drag which can cause jamming of the stuffing apparatus or even actual breaking of the casing at the stuffing area. Thus ring 10 and rim 14 of collar 8 of the present invention cooperate to substantially uniformly disperse and unfold the folds and pleats in the tubing while said casing is being advanced through passage 30 and over the outlet of stuffing horn 6. This is particularly important when stuffing plastic casing in a cold temperature on cold apparatus.

Referring to FIG. 3, when the casing is filled to a predetermined length, the product stoppering device 18 is advanced so as to stop the flow of the product. Frame cylinder 71 of cylinder assembly 69 is energized to advance the carriage assembly 32 away from the end of the stuffing horn 6 to the clip closure station. At this position, the filled casing closure apparatus 68 is energized via suitable pneumatic cylinder means (not shown) whereupon gathering plates 88 and the metal clip applicator means are advanced to gather, neck down the casing and apply a second or aft end clip closure 84. When the clip closure operation is completed, the closure apparatus 68 is retracted, leaving the stuffed casing in an unrestricted state. Next, product indexing cylinder 44 is energized (FIG. 4) advancing product shaping annulus 46 and the already closed stuffed product 80 into position for applying fore end clip closure 87 to the fore end of the succeeding length of casing.

When the fore end clip closure 87 has been completed, the gathering shoe cylinder 56 is energized thereby advancing the attached gathering shoe 54 to the center line of the stuffing apparatus. Knife cylinder 60 is energized thereby advancing the attached knife 58 toward slot 55 in gathering shoe 54. With the full extension of cylinder 56 and cylinder 60, the gathered casing is severed approximately midway the aft end closure 84 and fore end closure 84. After the casing has been severed, the closure apparatus 68 is deenergized to retract the gathering plates 88, and the gathering shoe 54 and knife 58 are then retracted leaving the stuffed casing package in an unrestricted state. Carriage assembly 32 is thereupon retracted by retracting frame cylinder 71 to the site shown in FIG. 2 thus positioning the stuffing apparatus at the starting station where it is ready to repeat the stuffing cycle. As shown in FIG. 4, after the casing severing means 50 is retracted, the filled casing 80 can be removed by rotatably tripping the package article trough 38 about a suitable journal (not shown).

Apparatus as aforedescribed and shown in the drawings has been constructed and tested successfully in operations involving packaging of ground beef in plastic film casings made of polyvinylidene chloride in cold rooms at or near the freezing temperature of 32°C. These plastic film casings had heretofore been found to be unsuitable for such cold room stuffing because they had a tendency to deshirr in a non-uniform manner which at times resulted in localizing excessive uncontrollable drag on the casings when advanced through the truncated conical passage 30. It is believed that the formally observed jamming, and in some instances the tearing, of plastic casings in prior art stuffing apparatus under cold temperature environments could have been due to this localizing of excessive drag caused by non-uniform deshirring of the film casings.

As stated above, the present invention will work equally well with practically all sorts of flexible film tubings such as, for instance, those made of cellulosic films and those of thermoplastic films such as polyolefin, polyvinylchloride, and polyvinylidene chloride polymers or copolymers.

The location and shape of ring 10 and ring 8 along with their cooperative annular element 28 can vary somewhat as long as they coact as described above to define passages 82 and 30, through which in passing in slipping movement, the casing 4 can be effectively and efficiently depleated and unfolded from its shirred condition on stuffing horn 6 into condition for its substantially uniform advancement through the casing restraining element 48 whereupon it is then stuffed with pressurized product. The particular location and shape of these components as shown in the drawings are believed to be the best arrangement for use with plastic film casings in cold room packaging processes.

Thus the present invention provides solutions to a number of problems heretofore encountered in cold room packaging of viscous product and makes for a significant advance in the art. Alternative embodiments and modes of practicing the invention, but within its spirit and scope, will, in the light of this disclosure, occur to persons conversant with the packaging arts. It is intended, therefore, that this description be taken as illustrative only and not construed in any limiting sense.

What is claimed is:

1. An apparatus for stuffing flowable product into shirred tubing which comprises:

a. a stuffing horn having an inlet end for receiving flowable product from a pressurized supply and a discharge end for discharging the product;
   b. a collar concentrically centrally detachably secured on said horn having a tapered surface portion proximal said horn discharge end;
   c. a rim portion positioned at the aft end of said collar concentrically disposed around said horn;
   d. a first annulus having an internal diameter larger than the outer diameter of said stuffing horn and smaller than the outer diameter of the rim, said annulus being loosely centrally disposed on said horn intermediate said rim and said horn inlet end to define a passage through which tubing being stuffed can be constricted to effectively provide primary depleating of the tubing whereupon the tubing can then be advanced toward and over said rim to effectively provide secondary depleating and unfolding of the tubing;
   e. a second annulus removably centrally aligned with said stuffing horn having a tapered inner surface adapted to mate with said tapered surface portion of said collar disposed on said horn to define a passage of predetermined spacing proximal said horn discharge end through which tubing being stuffed can be constrained in slipping movement as it is being stuffed with a pressurized flowable product;
   f. means to intermittently advance and retract said second annulus to and from the mating arrangement with said collar;
   g. product stoppering means adapted to be indexed to a first position so as to allow the passage of pressurized product out through the discharge end of the stuffing horn and then to be indexed to a second position so as to prevent the flow of pressurized product out through said discharge end of the stuffing horn; and
   h. means to index said stoppering means selectably at said first and second positions.

2. The apparatus of claim 1 wherein said collar has a truncated conical external surface and said second annulus has a truncated conical internal surface adapted to mate with the external surface of said collar so as to define a truncated conical passage therebetween.

3. The apparatus of claim 1 wherein the rim forms an integral part of the collar and is disposed at the aft end of said collar.

4. The apparatus of claim 1 wherein a product flowback control means is added which comprises a third annulus adapted to be removably centrally aligned with the discharge end of said stuffing horn, said third annulus having an inner diameter larger than the outer diameter of the discharge end of the stuffing hor so as to define a circumferential passage between the third annulus and said discharge end of the stuffing horn through which the tubing being stuffed can be passed in slipping contact against the stuffing horn thereby effectively preventing flowback of the pressurized flowable product exiting from the horn discharge end; and means for intermittently reciprocating the third annulus between a first site concentrically about the stuffing horn discharge end and a second site away from the horn discharge end.

5. The apparatus of claim 4 wherein the collar has a truncated conical external surface and said second annulus has a truncated conical internal surface adapted to mate with the external surface of said collar so as to define a truncated conical passage therebetween.

6. The apparatus of claim 4 wherein the rim forms an integral part of the collar and is disposed at the aft end of said collar.

7. The apparatus of claim 1 wherein the product stoppering means is disposed longitudinally concentrically interiorly of the stuffing horn and is adapted to be intermittently reciprocally movable inboard of the discharge end of said horn between a first site in which a product stuffing flow can proceed through the stuffing horn around the stoppering means and out through the discharge end of said horn; and a second site in which the product stuffing flow would be stoppered at the discharge end of the stuffing horn by said product stoppering means.

8. The apparatus of claim 7 wherein the collar has a truncated conical external surface and said second annulus has a truncated conical internal surface adapted to mate with the external surface of said collar so as to define a truncated conical passage therebetween.

9. The apparatus of claim 7 wherein the rim forms an integral part of the collar and is disposed at the aft end of said collar.

10. A method for sheathing a long length shirred tubing on a stuffing horn preparatory to stuffing the fore end wall of the tubing with pressurized product and forming it into unit size packages which comprises:
  a. sheathing a shirred tubing onto a stuffing horn having an inlet end and a discharge end;
  b. deshirring and advancing the fore end of the tubing through the inner diameter of a first annulus loosely disposed on said horn toward the discharge end of said horn so as to provide primary depleating of the tubing;
  c. securing a collar proximal the discharge end of said horn;
  d. further advancing said deshirred tubing fore end about a rim disposed at the aft end of said collar secured proximal the discharge end of said horn so as to provide secondary depleating and unfolding of the tubing; and
  e. closing the fore end of the tubing wall with a fluid-tight closure at the fore end of the collar.

11. The method of claim 10 wherein flowable product is stuffed into shirred tubing comprising the additional following steps:
  e. retracting said closed tubing to abut the discharge end of said stuffing horn;
  f. releasing a pressurized flowable product from the discharge end of said stuffing horn to advance the shirred tubing through the first annulus for primary depleating and over the collar for secondary depleating and unfolding of the tubing, to progressively stuff the tubing;
  g. stopping the flow of pressurized material after a predetermined length of tubing has been stuffed;
  h. advancing the stuffed tubing from the discharged end of said stuffing horn to a closure station;
  i. applying a fluid-tight closure at the aft end of said stuffed tubing at the closure station;
  j. further advancing said stuffed tubing to position the trailing unfilled tubing at said closure station;
  k. applying a fluid-tight closure at the fore end of the succeeding trailing unfilled tubing;
  l. severing said stuffed closed end tubing intermediate said aft end closure and said fore end closure of the succeeding trailing unfilled tubing; and
  m. removing said stuffed closed end tubing.

* * * * *